May 11, 1937.  E. WEISSE  2,080,352
OPTICAL INSTRUMENT
Filed Jan. 7, 1935

INVENTOR
ERNST WEISSE
BY
ATTORNEY

Patented May 11, 1937

2,080,352

UNITED STATES PATENT OFFICE 2,080,352

OPTICAL INSTRUMENT

Ernst Weisse, Leipzig-Leutzsch, Germany

Application January 7, 1935, Serial No. 649
In Germany January 6, 1934

10 Claims. (Cl. 88—2.2)

(Granted under the provisions of sec. 14, act of March 2, 1927, 357 O. G. 5)

This invention relates to optical instruments and particularly to a method for determining the plane of an image and means for carrying out said method.

Heretofore in order to determine the location of the focal plane of an image it was necessary to project the image on a surface such as a ground glass.

It is an object of the present invention to provide means for determining the location of the focal plane of an image without projecting it upon a dispersing or other surface.

A more particular object is to locate the focal plane of an image as by viewing the image through a lens having areas of differing refracting characteristics so that when the said lens is located exactly in the plane of the image those parts of the image which are viewed through the said different areas of the lens will all appear the same size.

Another object is to provide a range finder whereby the distance of an object from the instrument may be determined by locating the position of an image of said object by viewing said image partly through refracting means such as a certain portion of a lens and partly through areas of different refracting characteristics whereby location of the image is ascertained when all parts of the image appear the same in size, and determining the range from the location of said viewing lens.

With these and other objects in view, the invention consists in certain novel features of construction and combinations of parts, the essential elements of which are set forth in the appended claims, and an illustrative form of embodiment of which is hereinafter described with reference to the drawing which accompanies and forms part of the specification.

In said drawing the numeral 1 represents the objective lens which may be either a simple lens or, if desired, a compound lens. The numeral 2 represents a secondary lens which may be a collecting lens or a dispersing lens as shown. The objective and secondary lens are adjustable relative to each other. The arrow E may indicate the eye of the observer. The line H—H indicates the principal plane of the lens 2. In the form shown, the lens 2 is ground with an annular zone 3 formed parallel to the principal plane H—H.

Figure 1:
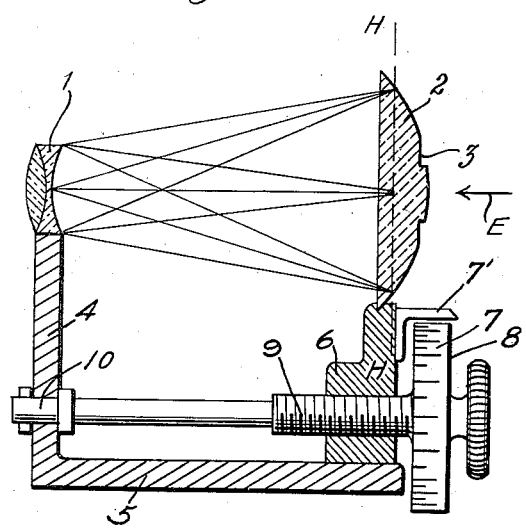
Fig. 1 shows a pair of lenses illustrating one form of the invention.
Figure 2:
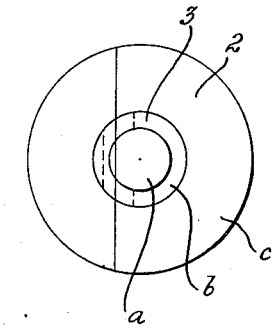
Fig. 2 shows one of the lenses of Fig. 1 in elevation.

If an object is located at some distance to the left of the lens 1 a real image thereof will be formed in some plane to the right of the objective lens. If the secondary lens is located in the position shown, i. e., with its principal plane H—H coinciding with the focal plane of the image of said object, the refracting sections $a$ and $c$ of said lens 2 will have no magnifying or reducing effect upon the view as seen by an eye or other optical device located in the line E and, therefore, that part of the view seen through the annular zone $b$ will be on the same scale and the three fields $a$, $b$, and $c$, will blend into one view. If, however, the secondary lens is located so that its principal plane H—H does not lie in the plane of the image, those parts of the view seen through the refracting portions $a$ and $c$ of the secondary lens will appear on a larger or smaller scale. Therefore, the secondary lens can be very quickly and very accurately adjusted to the position where the entire view blends into one composite whole. A suitable scale is preferably provided from which the distance of the object from the instrument can be readily read. This scale means may be formed as shown in Fig. 1. The lens 1 may be supported on an arm 4 connected with a base member 5 upon which is slidably mounted a support member 6 for the secondary lens 2. In the form shown, the location of the lens 2 relative to lens 1 may be ascertained from a graduated scale 7 upon a wheel 8 carried by the threaded shaft 9, the threads of which engage with threads in the support 6. The other end of the shaft 9 is connected for rotation, but not for sliding, with the members 4—5. It will be seen that by rotating the wheel 8 the lens 2 is moved relative to lens 1 and that by suitable graduations 7 upon the wheel 8 the distance of an object, the image of which lies in the principal plane of the lens 2, may be directly read from said graduated scale, by reference to the pointer 7'.

The method and means described can also be used for other purposes such as focusing photographic apparatus and also as a combined view finder and range finder in photographic and other apparatus.

Figure 3:
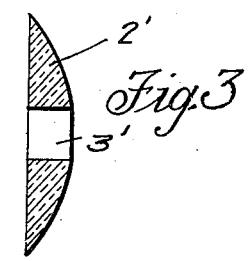
Fig. 3 illustrates a modified form of secondary lens.

The lens 2 may be either convex or a concave although the former is usually preferred because it provides an enlarged view. Instead of forming the lens 2 with a neutral zone such as 3, it may be formed with one or more holes or in any other way so as to present areas having different refracting properties. In Fig. 3 a secondary lens 2' is shown as provided with a central perforation 3'.

Furthermore, instead of viewing the collecting lens 2 directly it may be viewed through magnifying and/or erecting lenses or the means disclosed may be used in any other way, alone or in combination with other means.

While the form of mechanism herein shown and described is admirably adapted to fulfill the objects primarily stated, it is to be understood that it is not intended to confine the invention to the forms of embodiment herein disclosed, for it is susceptible of embodiment in various forms all coming within the scope of the claims which follow.

What is claimed is:

1. In an optical instrument, means for forming an image lying in a plane and means for detecting the location of the plane of said image comprising a lens adjacent said image plane and having areas of different refraction and means for supporting said lens for adjusting said lens into coincidence with said image plane.

2. An optical instrument according to claim 1 in which the lens is a convex lens with parts of its convex face formed parallel to its principal plane.

3. An optical instrument according to claim 1 in which the lens is formed so that parts thereof have zero refraction.

4. A rangefinder comprising means for forming an image lying in a plane and means for detecting the location of the plane of said image comprising a lens having areas of different refraction, means for supporting said lens adjacent said image plane and for adjusting said lens into coincidence with said image plane and scale means for indicating the position of said lens and therefore the distance of the object of said image.

5. In an optical instrument, means for forming an image lying in a plane and means for detecting the location of the plane of said image comprising a lens provided with a perforation therein, mounted for movement into the plane of said image.

6. In an optical instrument, means for forming an image lying in a plane and means for detecting the location of the plane of said image comprising a lens provided with an annular zone of different refracting characteristics, mounted for movement into the plane of said image.

7. A rangefinder comprising an objective lens forming an image lying in a plane and a secondary lens, said secondary lens having a principal plane and areas of different refraction, means for adjusting the positions of said lenses relative to each other and scale means for ascertaining the relative position of said lenses when the principal plane of the secondary lens coincides with the plane of said image formed by said objective lens.

8. A rangefinder comprising an objective lens forming an image lying in a plane and a secondary lens, said secondary lens having a principal plane and being formed with an annular zone of different refracting characteristics, means for adjusting said lenses relative to each other and scale means for ascertaining the relative positions of said lenses when the principal plane of the secondary lens coincides with the plane of said image.

9. In an optical instrument, means for forming an image lying in a plane and means for detecting the location of the plane of said image comprising a lens having areas of different refraction located adjacent said image plane, supporting means for said lens and for said image forming means, and means for varying the location of the plane of said image relative to said lens until the image plane and the principal plane of said lens coincide.

10. A rangefinder comprising means for forming an image lying in a plane and means for detecting the location of the plane of said image comprising a lens having areas of different refraction located adjacent said image plane, supporting means for said lens and for said image forming means, means for varying the location of said lens relative to said image plane until the image plane and the principal plane of said lens coincide, and scale means for indicating the position of said varying means and therefore the distance of the object of said image.

ERNST WEISSE.